United States Patent
Nagai et al.

(10) Patent No.: US 9,010,475 B2
(45) Date of Patent: Apr. 21, 2015

(54) SADDLE-RIDING TYPE VEHICLE

(75) Inventors: Ryuichi Nagai, Wako (JP); Tadashi Oshima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 369 days.

(21) Appl. No.: 13/397,217

(22) Filed: Feb. 15, 2012

(65) Prior Publication Data

US 2012/0211295 A1 Aug. 23, 2012

(30) Foreign Application Priority Data

Feb. 23, 2011 (JP) .................. 2011-037437

(51) Int. Cl.
| | |
|---|---|
| B60T 8/32 | (2006.01) |
| B62K 11/04 | (2006.01) |
| B62K 19/38 | (2006.01) |
| B62J 35/00 | (2006.01) |
| B60T 8/36 | (2006.01) |
| B62K 19/46 | (2006.01) |

(52) U.S. Cl.
CPC ............... B62J 35/00 (2013.01); B60T 8/3225 (2013.01); B60T 8/3685 (2013.01); B62K 11/04 (2013.01); B62K 19/38 (2013.01); B62K 19/46 (2013.01)

(58) Field of Classification Search
CPC ..... B60T 8/3225; B60T 8/3685; B62K 11/02; B62K 1/04; B62K 19/30; B62K 19/38; B62L 3/00
USPC ........ 180/219, 311; 303/9.63, 9.64, 9.75, 137
See application file for complete search history.

(56) References Cited

U.S. PATENT DOCUMENTS

| | | | | |
|---|---|---|---|---|
| 4,456,310 | A * | 6/1984 | Hayashi et al. ................. | 303/10 |
| 8,616,324 | B2 * | 12/2013 | Chipp ........................... | 180/311 |
| 2006/0151226 | A1 * | 7/2006 | Misaki et al. ................. | 180/227 |
| 2007/0200430 | A1 * | 8/2007 | Tani .............................. | 303/137 |
| 2010/0071985 | A1 * | 3/2010 | Harada ......................... | 180/219 |
| 2011/0031054 | A1 * | 2/2011 | Matayoshi .................... | 180/227 |
| 2011/0073063 | A1 * | 3/2011 | Tadokoro et al. ............. | 123/195 |
| 2011/0232987 | A1 * | 9/2011 | Chipp ........................... | 180/311 |

FOREIGN PATENT DOCUMENTS

| | | |
|---|---|---|
| JP | 3-220072 A | 9/1991 |
| JP | 2007-216814 A | 8/2007 |

\* cited by examiner

*Primary Examiner* — Anne Marie Boehler
*Assistant Examiner* — Maurice Williams
(74) *Attorney, Agent, or Firm* — Birch, Stewart, Kolasch & Birch, LLP

(57) ABSTRACT

An antilock brake control unit in a saddle-riding type vehicle includes a storage box disposed behind a head pipe and above an engine unit with a fuel tank disposed behind the storage box and obliquely above and behind the engine unit. A riding seat is disposed above the fuel tank. A seat supporting frame extends rearwardly and upwardly from rear parts of a pair of left and right main frames and crosses a front part of a fuel tank provided between the pair of left and right main frames with an upper end of the seat supporting frame supporting a front part of a riding seat. An antilock brake control unit is disposed at a position covered with the seat supporting frame from above.

12 Claims, 10 Drawing Sheets

US 9,010,475 B2

SADDLE-RIDING TYPE VEHICLE

CROSS-REFERENCE TO RELATED APPLICATIONS

The present application claims priority under 35 USC 119 to Japanese Patent Application No. 2011-037437 filed Feb. 23, 2011 the entire contents of which are hereby incorporated by reference.

BACKGROUND OF THE INVENTION

1. Field of the Invention

The present invention relates to a saddle-riding type vehicle including a vehicle body frame having a head pipe steerably supporting a front fork pivotally supporting a front wheel and a pair of left and right main frames extending rearwardly from the head pipe. An engine unit is supported on the vehicle body frame with a storage box supported on the main frames so as to be disposed behind the head pipe and above the engine unit. A fuel tank is supported on the vehicle body frame so as to be disposed behind the storage box and obliquely above and behind the engine unit. A riding seat is disposed above the fuel tank with an antilock brake control unit for preventing the vehicle from falling into a locked state in braking by controlling the pressure of a fluid supplied to a disc brake being provided on at least one of the front wheel and a rear wheel.

2. Description of Background Art

Japanese Patent Application Publication No. Hei 3-220072 discloses a motorcycle in which an engine unit is supported on a vehicle body frame having a head pipe, a pair of left and right main frames extending rearwardly and downwardly from the head pipe. A pair of left and right seat rails extend rearwardly and upwardly from middle portions of the main frames on the rear side with a storage box and a fuel tank being supported on the vehicle body frame. The storage box is disposed behind the head pipe and above the engine unit with a rear part of the storage box being disposed above the front part of both the seat rails. The fuel tank is disposed between both the seat rails behind the storage box and obliquely above and behind the engine unit.

Japanese Patent Application Publication No. 2007-216814 discloses a motorcycle having a hydraulic modulator disposed between an engine unit supported on a vehicle body frame and a fuel tank disposed above the engine unit. The hydraulic modulator is configured to prevent the motorcycle from falling into a locked state in braking by controlling the pressure of a fluid supplied to a disc brake from a master cylinder.

However, in the motorcycle disclosed in Japanese Patent Application Publication No. Hei 3-220072, since the rear part of the storage box is disposed above the front part of the seat rails, there is a problem that the need to avoid the interference with the seat rails makes it difficult to increase the capacity of the storage box. Moreover, there is a demand to increase the capacity of the storage box as much as possible when the layout structure of the antilock brake control unit disclosed in Japanese Patent Application Publication No. 2007-216814, i.e., the structure in which the antilock brake control unit is disposed above the engine unit is applied to the saddle-riding type vehicle having the storage box disposed behind the head pipe and above the engine unit and having the fuel tank disposed behind the storage box and obliquely above and behind the engine unit.

SUMMARY AND OBJECTS OF THE INVENTION

The present invention was made in consideration of the foregoing circumstances. It is an object of an embodiment of the present invention to enable a saddle-riding type vehicle, which includes the storage box disposed behind a head pipe and above an engine unit and having a fuel tank disposed behind the storage box and obliquely above and behind the engine unit, to be provided with an antilock brake control unit while increasing the capacity of a storage box as much as possible.

For the purpose of solving the above-mentioned problems, according to object of an embodiment of the present invention a saddle-riding type vehicle includes a vehicle body frame having a head pipe steerably supporting a front fork pivotally supporting a front wheel and a pair of left and right main frames extending rearwardly from the head pipe. An engine unit is supported on the vehicle body frame with a storage box supported on the main frames so as to be disposed behind the head pipe and above the engine unit. A fuel tank is supported on the vehicle body frame so as to be disposed behind the storage box and obliquely above and behind the engine unit. A riding seat is disposed above the fuel tank. An antilock brake control unit is provided for preventing the vehicle from falling into a locked state in braking by controlling the pressure of a fluid supplied to a disc brake provided on at least one of the front wheel and a rear wheel. A seat supporting frame extends rearwardly and upwardly from the rear part of the pair of left and right main frames and crosses in front of the fuel tank. The seat supporting frame is provided between the pair of left and right main frames with an upper end of the seat supporting frame supporting a front part. The antilock brake control unit is disposed above the engine unit so as to be covered with the seat supporting frame from above.

According to an embodiment of the present invention, an antilock brake control unit includes a hydraulic modulator for adjusting a fluid pressure generated by hydraulic generating means, first hydraulic control means disposed below and in front of the hydraulic modulator so as to further control the fluid pressure from the hydraulic modulator, and a first hydraulic pipeline connecting the hydraulic modulator and the first hydraulic control means together and sloping forward and downwardly in the side view at least in a portion on a first hydraulic control means side is disposed in an area surrounded by the engine unit, the storage box and the fuel tank in the side view and is thus supported on the vehicle body frame.

According to an embodiment of the present invention, the antilock brake control unit further includes, in addition to the hydraulic modulator, the first hydraulic pipeline and the first hydraulic control means, a second hydraulic pipeline having one end connected to the hydraulic modulator, and a second hydraulic control means connected to another end of the second hydraulic pipeline so as to further control the fluid pressure from the hydraulic modulator and disposed on any one of the left and right sides of the hydraulic modulator. The antilock brake control unit and a modulator stay fixed to the vehicle body frame so as to support the hydraulic modulator and are disposed between the pair of left and right main frames. The second hydraulic control means is fastened together with the hydraulic modulator to the modulator stay.

According to an embodiment of the present invention, the harness holding members holding harnesses are attached to the side opposite to one of the left and right sides of the modulator stay where the second hydraulic control means is disposed. The harness holding members disposed between both the main frames in the planar view.

According to an embodiment of the present invention, a projection projecting downwardly in front of the antilock brake control unit is integrally provided in a front lower portion of the storage box, and a change box is formed in the projection.

According to an embodiment of the present invention, an ECU box housing an ECU for controlling operations of the antilock brake control unit is fixed and disposed between the antilock brake control unit and the fuel tank.

According to an embodiment of the present invention, the hydraulic modulator includes a modulator main body and a cover integrally provided with a coupler and attached to the modulator main body. A pair of left and right sidewall parts are provided in the modulator stay so as to sandwich the modulator main body therebetween with the coupler being disposed between the modulator main body and one of the pair of left and right sidewall parts.

Note that first and second master cylinders 38 and 39 in an embodiment correspond to the hydraulic generating means of the present invention. A delay valve 41 in the embodiment corresponds to the first hydraulic control means of the present invention. A proportional pressure reducing valve 43 in the embodiment corresponds to the second hydraulic control means of the present invention.

According to an embodiment of the present invention, the seat supporting frame provided between the pair of left and right main frames crosses the front part of the fuel tank and supports the front part of the riding seat at the upper end thereof. Thus, the load on the front part of the riding seat can be received by the seat supporting frame while avoiding mutual interference between the seat supporting frame and the fuel tank. Moreover, since the seat supporting frame extends rearwardly and upwardly from the rear parts of the main frames, the rear lower part of the storage box can be formed to largely extend downwardly while avoiding the interference with the seat supporting frame. Thus, the capacity of the storage box can be increased as much as possible. Moreover, since the antilock brake control unit is disposed above the engine unit so as to be covered with the seat supporting frame from above, the storage box, the fuel tank and the antilock brake control unit can be compactly disposed.

According to an embodiment of the present invention, the antilock brake control unit including the hydraulic modulator, the first hydraulic control means disposed below and in front of the hydraulic modulator, and the first hydraulic pipeline connecting the hydraulic modulator and the first hydraulic control means together is disposed in the area surrounded by the engine unit, the storage box and the fuel tank in the side view, with the first hydraulic pipeline sloping forward and downwardly in the side view at least in the portion on the hydraulic control means side. As a result, the antilock brake control unit can be compactly disposed while preventing the disposition of the antilock brake control unit from affecting the capacity of the storage box.

According to an embodiment of the present invention, the antilock brake control unit further includes, in addition to the hydraulic modulator, the first hydraulic pipeline and the first hydraulic control means, the second hydraulic pipeline and the second hydraulic control means and the modulator stay for supporting the hydraulic modulator are disposed between the pair of left and right main frames included in the vehicle body frame. Thus, the antilock brake control unit can be compactly disposed in the vehicle width direction. Moreover, since the second hydraulic control means is fastened together with the hydraulic modulator to the modulator stay, a special part for supporting the second hydraulic control means on the modulator stay is not required, thereby reducing the number of parts.

According to an embodiment of the present invention, the harness holding members are attached to the side opposite to the side where the second hydraulic control means is disposed, and the harness holding members are disposed between both the main frames in the planar view. Thus, not only the antilock brake control unit but also the harnesses can be compactly disposed between the left and right main frames.

According to an embodiment of the present invention, the projection having the change box formed therein is integrally provided in the front lower portion of the storage box so as to project downwardly in front of the antilock brake control unit. Thus, the change box can be formed in the storage box while avoiding the interference with the first hydraulic control means in the antilock brake control unit.

According to an embodiment of the present invention, the ECU box is fixed and disposed between the antilock brake control unit and the fuel tank. Thus, not only the antilock brake control unit but also the ECU box can be compactly disposed.

According to an embodiment of the present invention, the modulator main body is sandwiched between the pair of left and right sidewall parts provided in the modulator stay. The coupler included in the hydraulic modulator is disposed between the modulator main body and one of the pair of left and right sidewall parts. Thus, the harnesses for the antilock brake control unit, which are relatively large in size, and the antilock brake control unit can be compactly disposed in the vehicle width direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
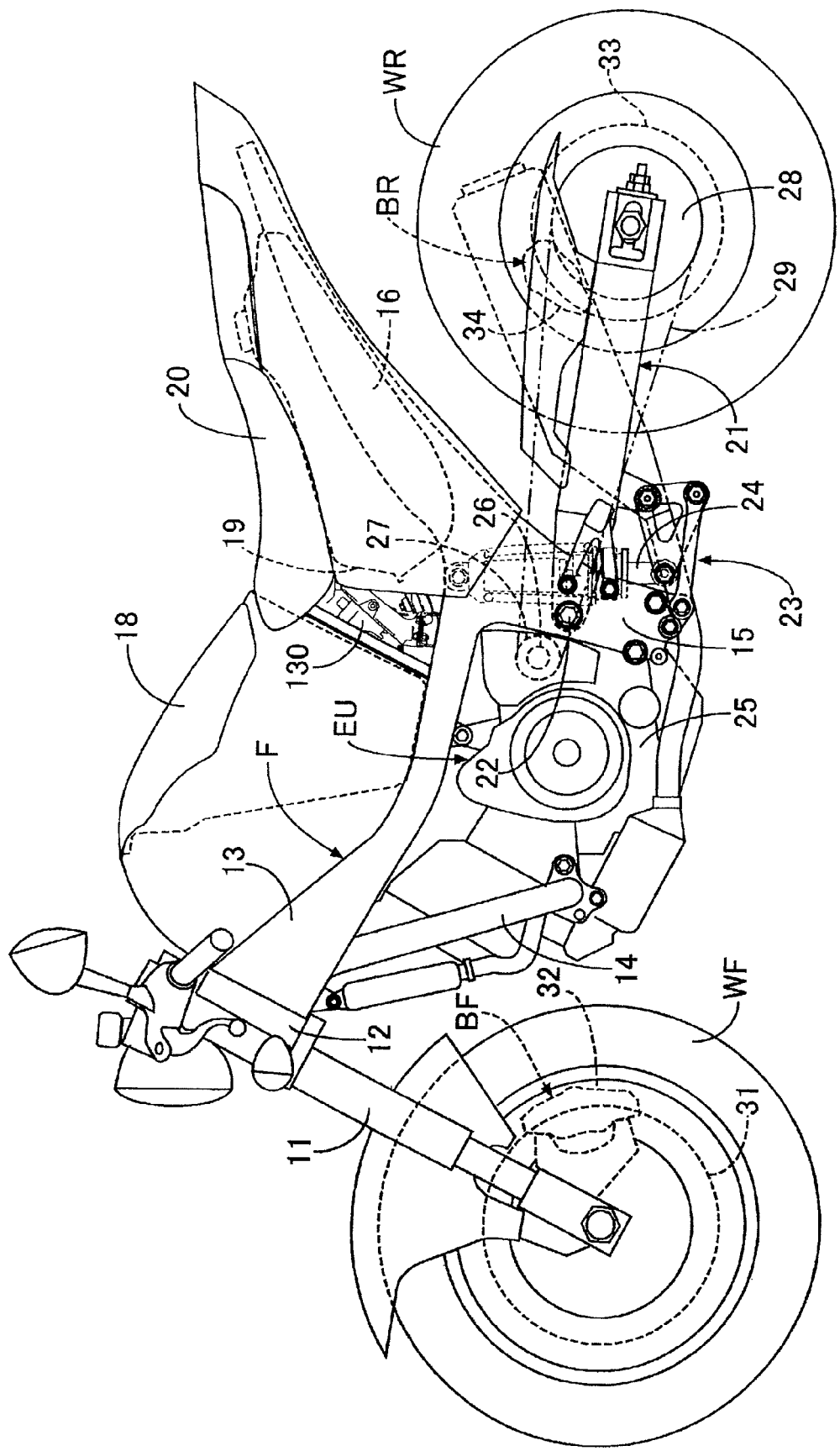
FIG. 1 is a side view of a motorcycle.

With reference to the accompanying FIGS. 1 to 10, embodiments of the present invention are described. As illustrated in FIG. 1, a vehicle body frame F of a motorcycle is a saddle-riding type vehicle including a head pipe 12 steerably supporting a front fork 11 pivotally supporting a front wheel WF, a pair of left and right main frames 13 . . . extending rearwardly so as to slope rearwardly and downwardly from the head pipe 12, a pair of left and right down frames 14 . . . connected to front ends of the main frames 13 . . . so as to slope rearwardly and downwardly at a steeper angle than the main frames 13 . . . , a pair of left and right pivot plates 15 . . . extending downwardly from rear ends of both the main frames 13 . . . , and a pair of left and right seat frames 16 . . . extending rearwardly and upwardly from both the pivot plates 15 . . . .

Below the main frames 13 . . . , an engine unit EU is disposed so as to be supported by the main frames 13 . . . , the down frames 14 . . . and the pivot plates 15 . . . . A storage box 18 disposed above the engine unit EU is supported by both the main frames 13 . . . . A fuel tank 19 is disposed behind the storage box 18 and obliquely above and behind the engine unit EU. A riding seat 20 supported by the seat frames 16 . . . is disposed so as to cover the fuel tank 19 from above.

A front end of a swing arm 21 pivotally supporting a rear wheel WR at its rear end is vertically swingably supported on the pivot plates 15 . . . by means of a support shaft 22. Also, a shock absorber unit 24 is provided between the pivot plate 15 . . . and a link mechanism 23 provided between the swing arm 21 and the pivot plate 15 . . . .

A gearbox (not shown) is housed in a crankcase 25 included in the engine unit EU. An endless chain is wound around a driving sprocket 27 fixed to an output shaft 26 of the gearbox on the left side of the crankcase 25 with a driven sprocket 28 provided coaxially with the rear wheel WR so as to be disposed on the left side thereof.

The rotation of the front wheel WF can be stopped by a front wheel disc brake BF including a brake disc 31 rotating with the front wheel WF and a caliper 32 supported on the front fork 11 so as to cross the periphery of the brake disc 31. The front wheel disc brake BF is disposed on the right side of the front wheel WF. Furthermore, the rotation of the rear wheel WR can be stopped by a rear wheel disc brake BR including a brake disc 33 rotating with the rear wheel WR and a caliper 34 supported on the front fork 11 so as to cross the periphery of the brake disc 33. The rear wheel disc brake BR is disposed on the right side of the rear wheel WR.

Figure 2:
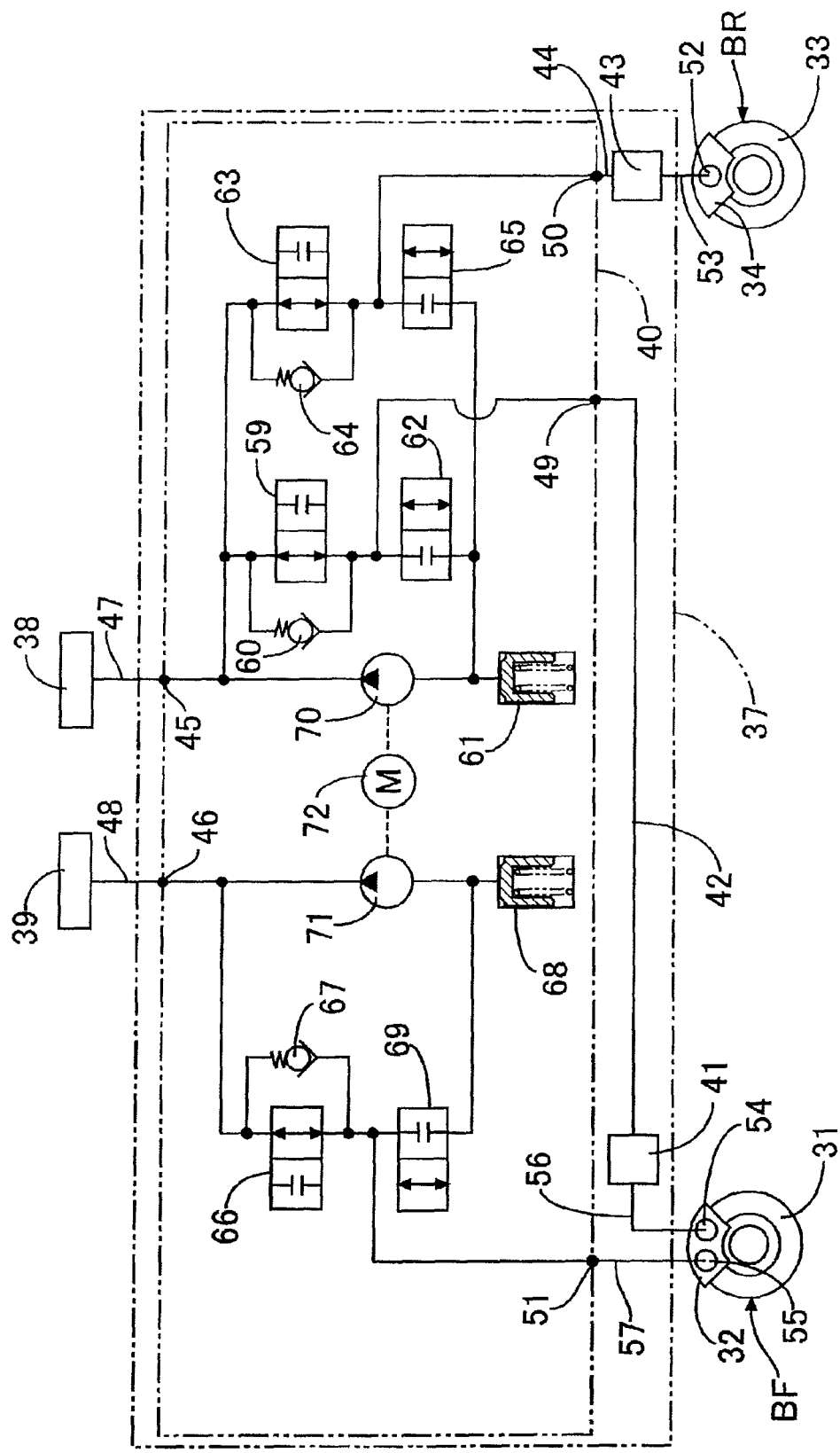
FIG. 2 is a block diagram showing a configuration of a brake hydraulic circuit.

In FIG. 2, the pressure of a fluid of the disc brake disposed on at least one of the front wheel WF and the rear wheel WR, in this embodiment, the pressure of a fluid supplied to the front wheel disc brake BF and the rear wheel disc brake BR is controlled by an antilock brake control unit 37 to prevent the vehicle from falling into a locked state in braking. The antilock brake control unit 37 includes a hydraulic modulator 40 for adjusting the fluid pressure generated by first and second master cylinders 38 and 39 which are hydraulic generating means, a delay valve 41 as a first hydraulic control means for further controlling the fluid pressure from the hydraulic modulator 40; a first hydraulic pipeline 42 connecting the hydraulic modulator 40 and the delay valve 41 together; a proportional pressure reducing valve 43 as a second hydraulic control means for further controlling the fluid pressure from the hydraulic modulator 40; and a second hydraulic pipeline 44 connecting the hydraulic modulator 40 and the proportional pressure reducing valve 43 together.

The first master cylinder 38 outputs a fluid pressure corresponding to an operation of a brake pedal (not shown) by a driver of the motorcycle. The fluid pressure from the first master cylinder 38 is guided to a first input port 45 of the hydraulic modulator 40 through a third hydraulic pipeline 47. In addition, the second master cylinder 39 outputs a fluid pressure corresponding to an operation of a brake lever (not shown) by the driver of the motorcycle. The fluid pressure from the second master cylinder 39 is guided to a second input port 46 of the hydraulic modulator 40 through a fourth hydraulic pipeline 48.

The hydraulic modulator 40 has first, second and third output ports 49, 50 and 51. The first hydraulic pipeline 42 having one end connected to the first output port 49 has the other end connected to the delay valve 41, while the second hydraulic pipeline 44 having one end connected to the second output port 50 has the other end connected to the proportional pressure reducing valve 43.

The caliper 34 of the rear wheel disc brake BR has a single pod 52, and the proportional pressure reducing valve 43 is connected to the pod 52 included in the caliper 34 of the rear wheel disc brake BR through a fifth hydraulic pipeline 53. Meanwhile, the caliper 32 of the front wheel disc brake BF has a pair of pads 54 and 55. The delay valve 41 is connected to one pad 54 through a sixth hydraulic pipeline 56, while the third output port 51 of the hydraulic modulator 40 is connected to the other pad 55 through a seventh hydraulic pipeline 57.

The hydraulic modulator 40 includes a first normally open solenoid valve 59 connected to the first input port 45; a first check valve 60 connected in parallel with the first normally open solenoid valve 59; a first reservoir 61; a first normally closed solenoid valve 62 provided between the first normally open solenoid valve 59 and the first reservoir 61. A second normally open solenoid valve 63 is connected to the first input port 45 in parallel with the first normally open solenoid valve 59. A second check valve 64 is connected in parallel with the second normally open solenoid valve 63 with a second normally closed solenoid valve 65 provided between the second normally open solenoid valve 63 and the first reservoir 61. A third normally open solenoid valve 66 is connected to the second input port 46 with a third check valve 67 connected in parallel with the third normally open solenoid valve 66; a second reservoir 68; a third normally closed solenoid valve 69 provided between the third normally open solenoid valve 66 and the second reservoir 68; a first pump 70 for pumping up a brake fluid in the first reservoir 61 and releasing it into the first input port 45; a second pump 71 for pumping up a brake fluid in the second reservoir 68 and releasing it into the second input port 46; and an electric motor 72 for driving the first and second pumps 70 and 71. A connection point between the first normally open solenoid valve 59 and the first normally closed solenoid valve 62 is connected to the first output port 49. A connection point between the second normally open solenoid valve 63 and the second normally closed solenoid valve 65 is connected to the second output port 50. A connection point between the third normally open solenoid valve 66 and the third normally closed solenoid valve 69 is connected to the third output port 51.

The hydraulic modulator 40 as described above enables braking of the rear wheel WR and the front wheel WF by allowing the fluid pressure of the first master cylinder 38 to act on the pod 52 of the caliper 34 in the rear wheel disc brake BR as well as on the pod 54 of the caliper 32 in the front wheel disc brake BF, and also enables braking of the front wheel WF by allowing the fluid pressure of the second master cylinder 39 to act on the pod 55 of the caliper 32 in the front wheel disc brake BF. Moreover, the hydraulic modulator 40 also enables the braking force of the rear wheel WR and the front wheel WF to be adjusted by controlling opening and closing of the first to third normally open solenoid valves 59, 63 and 66 and the first to third normally closed solenoid valves 62, 65 and 69, and thereby adjusting the fluid pressure acting on the rear wheel disc brake BR and the front wheel disc brake BF.

Figure 3:
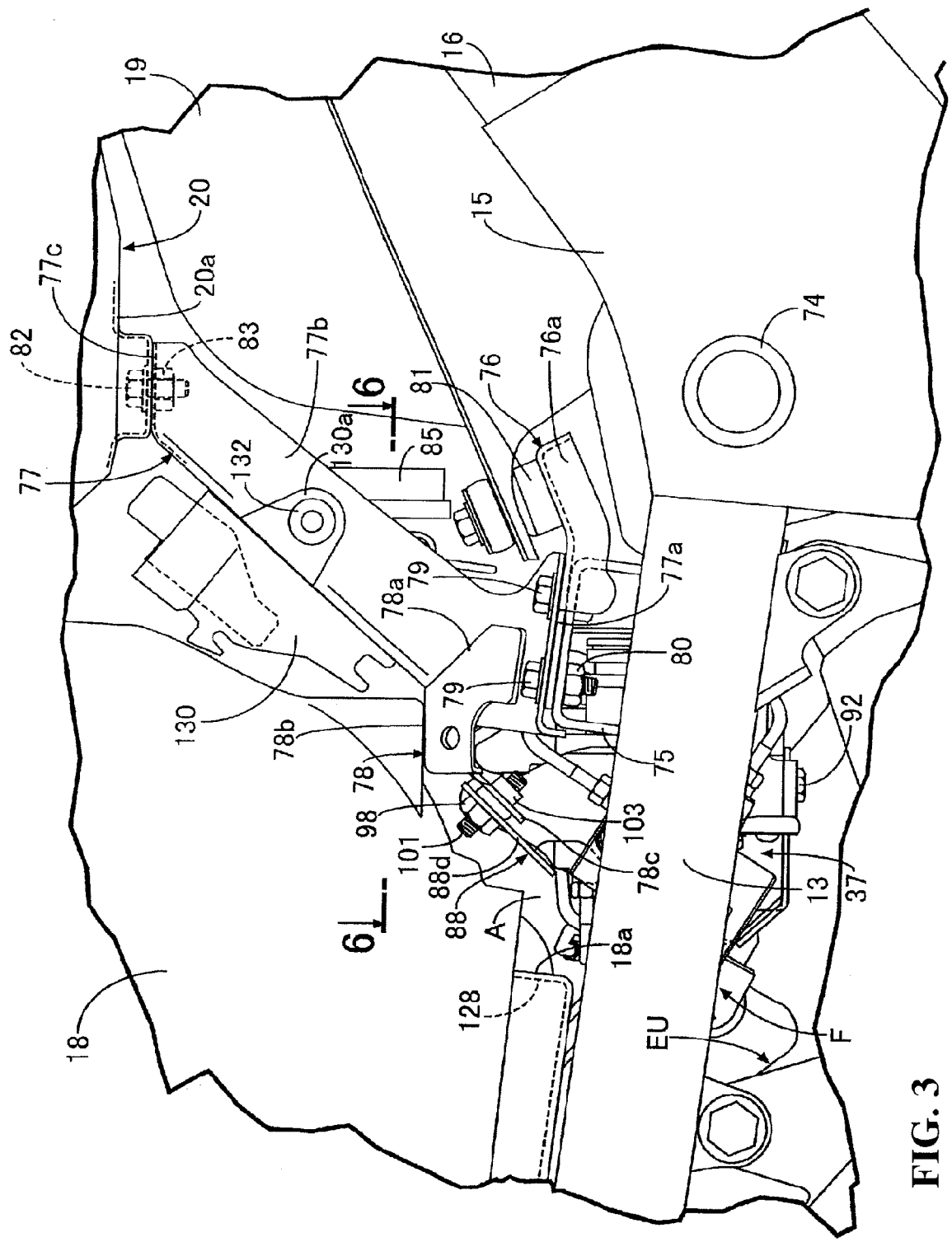
FIG. 3 is an enlarged view of a main part of FIG. 1.

Referring to FIG. 3, the antilock brake control unit 37 is supported on the vehicle body frame F so as to be disposed in an area A surrounded by the engine unit EU, the storage box 18 and the fuel tank 19 in the side view.

Figure 4:
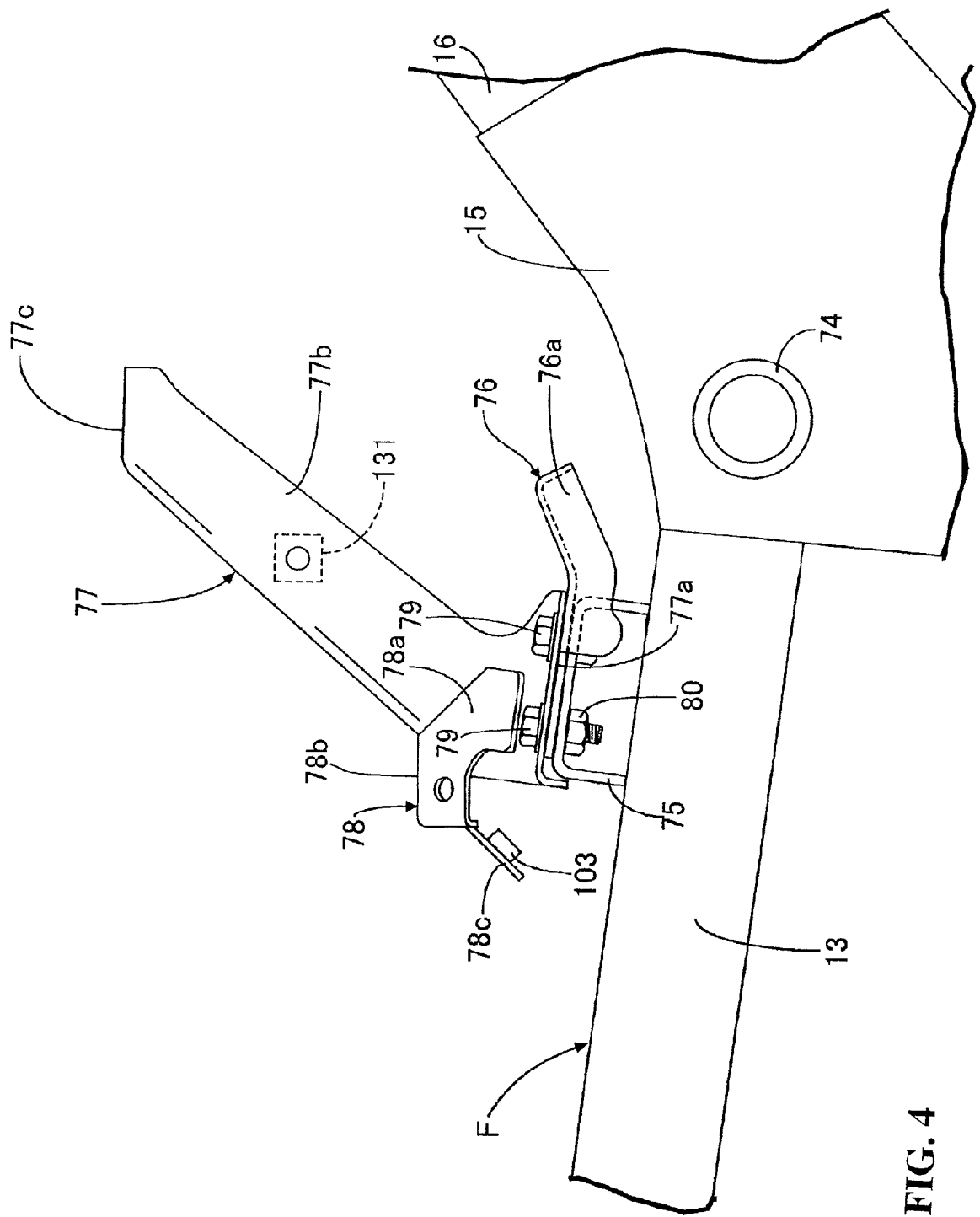
FIG. 4 is a side view showing a part of a vehicle body frame.
Figure 5:
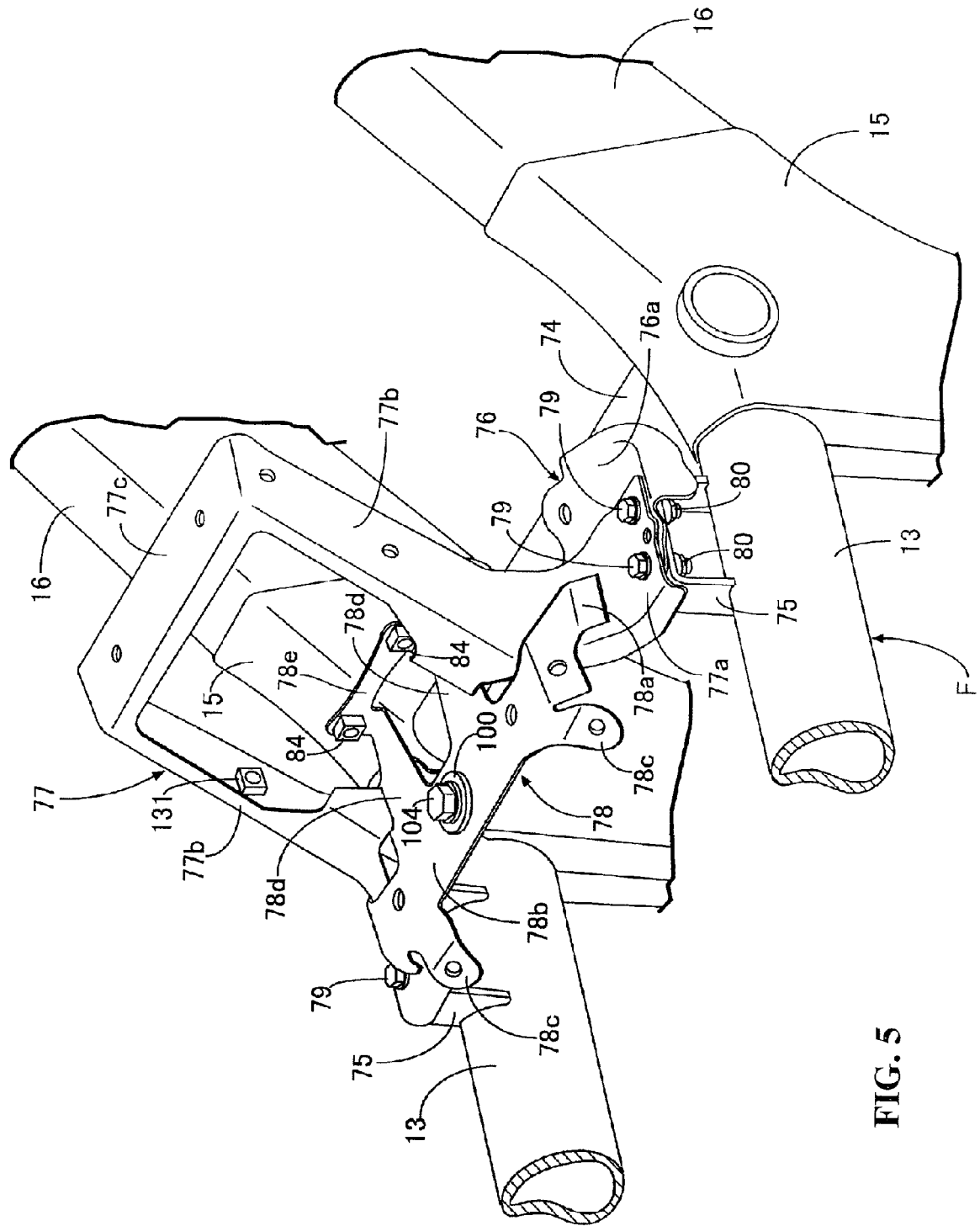
FIG. 5 is a perspective view of the vehicle body frame shown in FIG. 4.

Referring to FIGS. 4 and 5, the vehicle body frame F includes a cross pipe 74 crossing between upper parts of the pair of left and right pivot plates 15 . . . . An upper end of the rear shock absorber unit 24 is connected to the cross pipe 74.

The vehicle body frame F further includes a tank supporting frame 76 extending in a vehicle width direction in such a manner that both left and right ends thereof are supported on receiving frames 75 . . . fixed to the upper parts of the pair of left and right main frames 13 . . . . A seat supporting frame 77 is disposed in such a manner that both ends thereof in the vehicle width direction sandwich both the ends of the tank supporting frame 76 between the receiving frames 75 with a stay supporting frame 78 fixed to the seat supporting frame 77. The both ends of the tank supporting frame 76 and both the ends of the seat supporting frame 77 are fastened and fixed together to the receiving frames 75 . . . with a pair of left and right bolts 79, 79 . . . and nuts 80, 80 . . . .

The tank supporting frame 76 has a pair of left and right tank supporting plates 76a . . . integrated therewith, the tank supporting plates 76a extending rearwardly from the receiving frames 75 . . . at both the left and right ends of the tank supporting frame 76. The both left and right sides of the front part of the fuel tank 19 are supported on the tank supporting plates 76a . . . by means of mount rubber 81 . . . (see FIG. 3).

The seat supporting frame 77 is provided between the pair of left and right main frames 13 so as to cross over the front part of the fuel tank 19 while extending rearwardly and upwardly from the rear parts of the main frames 13 and also to support the front part of the riding seat 20 at its upper end. The seat supporting frame 77 integrally has a pair of left and right mounting plate parts 77a . . . fastened to the receiving frames 75 . . . by fastening together with both the ends of the tank supporting frame 76, a pair of left and right supporting leg parts 77b rising backward and upwardly from inner edges of the mounting plates 77a . . . , and a seat supporting plate part 77c connecting upper ends of both the supporting leg parts 77b . . . together. As clearly shown in FIG. 3, the front part of a bottom plate 20a of the riding seat 20 is fastened to the seat supporting plate part 77c at two left and right locations with bolts 82 . . . and nuts 83 . . . .

The stay supporting frame 78 integrally has a pair of left and right mounting plate parts 78a . . . welded to the lower portions of the pair of left and right supporting leg parts 77b . . . in the seat supporting frame 77, a connecting plate part 78b disposed in front of both the supporting leg parts 77b in the seat supporting frame 77 to connect between both the mounting plate parts 78a, a pair of left and right front supporting plate parts 78c . . . extending forward and downwardly from both left and right ends of the connecting plate part 78b, a pair of left and right extending plate parts 78d . . . extending rearwardly from the connecting plate part 78b on the inner side than the front supporting plate parts 78c . . . , and a rear connecting plate part 78e connected to rear ends of the extending plate parts 78d at right angles to each other to connect between the rear ends of the extending plate parts 78d. Weld nuts 84 . . . are fixed to front surfaces of both the left and right ends of the rear connecting plate part 78e. A tilt sensor 85 (see FIGS. 3 and 6) is provided behind the rear connecting plate part 78e. The tilt sensor 85 is supported on the rear connecting plate part 78e by means of the weld nuts 84 . . . and screw members 86 . . . (see FIG. 6) screwed to the weld nuts 84 . . . .

In FIGS. 6 to 9, the hydraulic modulator 40 includes a metal modulator main body 88 including the first to third normally open solenoid valves 59, 63 and 66, the first to third normally closed solenoid valves 62, 65 and 69, the first to third check valves 60, 64 and 67, the first and second reservoirs 61 and 68 and the first and second pumps 70 and 71. An electric motor 72 is mounted on its front surface with a plastic cover 89 attached to a rear surface of the modulator main body 88 so as to house all electrical connection circuits to the first to third normally open solenoid valves 59, 63 and 66, the first to third normally closed solenoid valves 62, 65 and 69 and the electric motor 72. In the state where the hydraulic modulator 37 is mounted on the vehicle body frame F, a coupler 89a positioned to the right of the modulator main body 88 is formed integrally with the cover 89 so as to be open forward.

The modulator main body 88 of the hydraulic modulator 37 is supported by a modulator stay 90 fixed to the vehicle body frame F. The antilock brake control unit 37 covered with the seat supporting frame 77 from above and the modulator stay 90 supporting the hydraulic modulator 40 are disposed between the rear parts of the pair of left and right main frames 13 in the vehicle body frame F.

Figure 10:
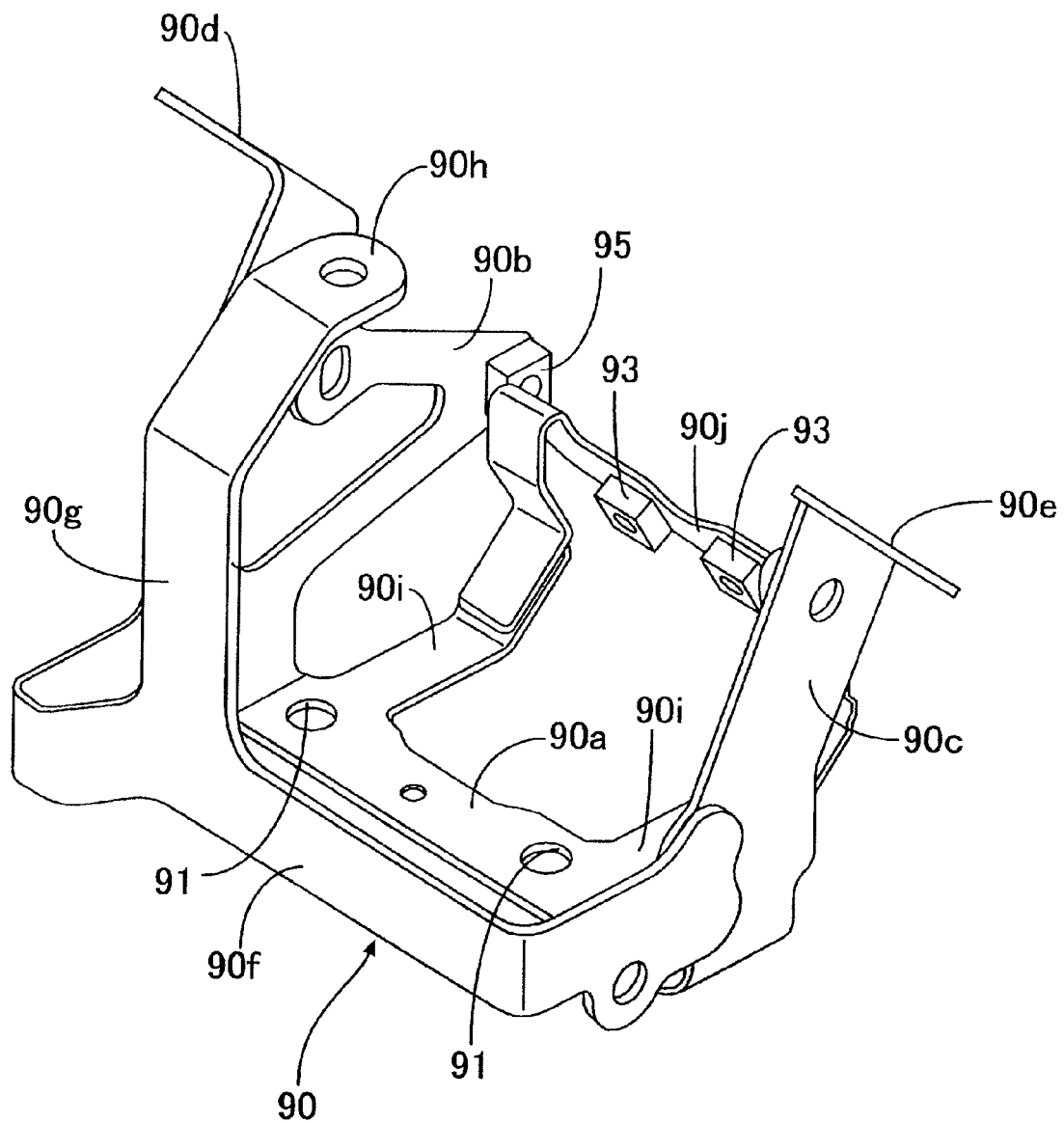
FIG. 10 is a perspective view of the modulator stay seen from right oblique behind.

Referring also to FIG. 10, the modulator stay 90 is formed by welding three bent plate materials. The modulator stay 90 includes a lower supporting plate part 90a extending in the vehicle width direction below the modulator main body 88 in the hydraulic modulator 40; a left sidewall part 90b connected to the left end, in the vehicle width direction, of the lower supporting plate part 90a so as to vertically extend to the left of the modulator main body 88; a right sidewall part 90c connected to the right end, in the vehicle width direction, of the lower supporting plate part 90a so as to vertically extend to the right of the modulator main body 88; an upper left supporting plate part 90d connected to the upper end of the left sidewall part 90b at right angles while sloping forward and downwardly; an upper right supporting plate part 90e connected to the upper end of the right sidewall part 90c at right angles while sloping forward and downwardly; a rear frame part 90f disposed below and behind the cover 89 in the hydraulic modulator 40 and having both ends connected to rear lower portions of the left sidewall part 90b and right sidewall part 90c, respectively; a rear upright part 90g rising upwardly from the rear frame part 90f in the portion closer to the left sidewall part 90b; an upper rear supporting plate part 90h connected to the upper end of the rear upright part 90g; a pair of left and right forward extending parts 90i, 90i extending forward from the lower supporting plate part 90a on the inner side than the left sidewall part 90b and the right sidewall part 90c; and a front supporting plate part 90j connected to the front end of the forward extending part 90i . . . so as to be disposed below and in front of the modulator main body 88 in the hydraulic modulator 40.

The lower supporting plate part 90a is provided with a pair of left and right insertion holes 91, 91. The modulator main body 88 placed on the lower supporting plate part 90a is fixed onto the lower supporting plate part 90a with bolts 92 . . . inserted into the insertion holes 91 . . . . In the state where the modulator main body 88 is fixed onto the lower supporting plate part 90a, the modulator main body 88 is sandwiched between the left sidewall part 90b and right sidewall part 90c of the modulator stay 90. Also, the coupler 89a of the hydraulic modulator 40 is disposed between the modulator main body 88 and the right sidewall part 90c.

The delay valve 41 is disposed in front of the front supporting plate part 90j of the modulator stay 90, i.e., below and in front of the hydraulic modulator 40. The delay valve 41 is fixed to the front supporting plate part 90j by screwing bolts 94, 94 inserted into the delay valve 41 to a pair of left and right weld nuts 93, 93 fixed to the rear surface of the front supporting plate part 90j.

The first hydraulic pipeline 42 guiding the fluid pressure outputted from the hydraulic modulator 40 to the delay valve 41 is made of a bent metal pipe. The first hydraulic pipeline 42 has one end connected to the first output port 49 (see FIG. 2) open in the upper surface of the modulator main body 88. Also, the first hydraulic pipeline 42 disposed so as to slope forward in the side view at least in a portion on a delay valve 41 side has the other end connected to the delay valve 41.

The proportional pressure reducing valve 43 is disposed so as to sandwich the left sidewall part 90b of the modulator stay 90 between the modulator main body 88 and itself on one of the sides of the hydraulic modulator 40, in this embodiment, on the left side of the hydraulic modulator 40. Also, a bolt 96 inserted into the proportional pressure reducing valve 43 is screwed to a weld nut 95 fixed to the front inner surface of the left sidewall part 90b, and a bolt 97 inserted into the proportional pressure reducing valve 43 and the left sidewall part 90b is screwed to the modulator main body 88. More specifically, the proportional pressure reducing valve 43 is fastened to the left sidewall part 90b of the modulator stay 90 with the bolt 96 and the nut 95, and is also fastened and fixed to the left sidewall part 90b together with the modulator main body 88 with the bolt 97.

The second hydraulic pipeline 44 guiding the fluid pressure outputted from the hydraulic modulator 37 to the proportional pressure reducing valve 43 is made of a bent metal pipe. The second hydraulic pipeline 44 has one end connected to the second output port 50 (see FIG. 2) open in the upper surface of the modulator main body 88. Also, the second hydraulic pipeline 44 first rising from the upper surface of the modulator main body 88 and then coming down to behind the proportional pressure reducing valve 43 has the other end connected to the proportional pressure reducing valve 43 from behind.

The modulator stay 90 having the hydraulic modulator 40 fixed thereto is supported on the vehicle body frame F. The upper left and right supporting plate parts 90d and 90e of the modulator stay 90 are supported, by means of mount rubber 98 and 99, on the pair of left and right front supporting plate parts 78c . . . included in the stay supporting frame 78 in the vehicle body frame F. Furthermore, the upper rear supporting plate part 90h of the modulator stay 90 is supported, by means of mount rubber 100, on the connecting plate part 78b included in the stay supporting frame 78.

The front supporting plate parts 78c . . . of the stay supporting frame 78 are disposed below the upper left and right supporting plate parts 90d and 90e of the modulator stay 90. Bolts 101 and 102, inserted into the mount rubber 98 and 99 mounted on the upper left and right supporting plate parts 90d and 90e, are screwed to weld nuts 103 . . . fixed to the lower surfaces of the front supporting plate parts 78c . . . . The connecting plate part 78b of the stay supporting frame 78 is disposed above the upper rear supporting plate part 90h of the modulator stay 90. A bolt 104 inserted into the mount rubber 100 mounted on the connecting plate part 78b is screwed to a weld nut 105 fixed to the lower surface of the upper rear supporting plate part 90h.

The third hydraulic pipeline 47 guiding the fluid pressure from the first master cylinder 38 to the hydraulic modulator 40 includes a connecting pipe 108 having one end connected to the first input port 45 (see FIG. 2) provided in the upper left portion of the front surface of the modulator main body 88 with a brake hose 109 having one end connected to the other end of the connecting pipe 108. The brake hose 109 extending leftward in front of the hydraulic modulator 40 extends rearwardly through the right side of the hydraulic modulator 40. The fourth hydraulic pipeline 48 guiding the fluid pressure from the second master cylinder 39 to the hydraulic modulator 40 includes a connecting pipe 110 having one end connected to the second input port 46 (see FIG. 2) provided in the upper right portion of the front surface of the modulator main body 88 with a brake hose 111 having one end connected to the other end of the connecting pipe 110. The brake hose 111 extends forward from the right side of the hydraulic modulator 40.

The fifth hydraulic pipeline 53 guiding the fluid pressure from the proportional pressure reducing valve 43 to the rear wheel disc brake BR includes a connecting pipe 112 having one end connected to the upper rear portion of the proportional pressure reducing valve 43 with a brake hose 113 having one end connected to the other end of the connecting pipe 112. The brake hose 113 extends to the right through the upper rear portion of the hydraulic modulator 40, and further extends rearwardly from the right side of the hydraulic modulator 40. The sixth hydraulic pipeline 56 guiding the fluid pressure from the delay valve 41 to the front wheel disc brake BF includes a connecting pipe 114 having one end connected to the proportional pressure reducing valve 43 with a brake hose 115 having one end connected to the other end of the connecting pipe 114. The brake hose 115 extends to the right in front of the hydraulic modulator 40, and further extends forward from the right side of the hydraulic modulator 40.

The seventh hydraulic pipeline 57 guiding the fluid pressure outputted from the hydraulic modulator 40 to the front wheel disc brake BF includes a connecting pipe 116 having one end connected to the upper surface of the modulator main body 88 so as to be connected to the third output port 51 (see FIG. 2) open in the upper surface of the modulator main body 88 with a brake hose 117 having one end connected to the other end of the connecting pipe 116. The brake hose 117 extends to the right after first rising from the upper surface of the modulator main body 88, and further extends forward on the right side of the hydraulic modulator 40.

Figure 9:
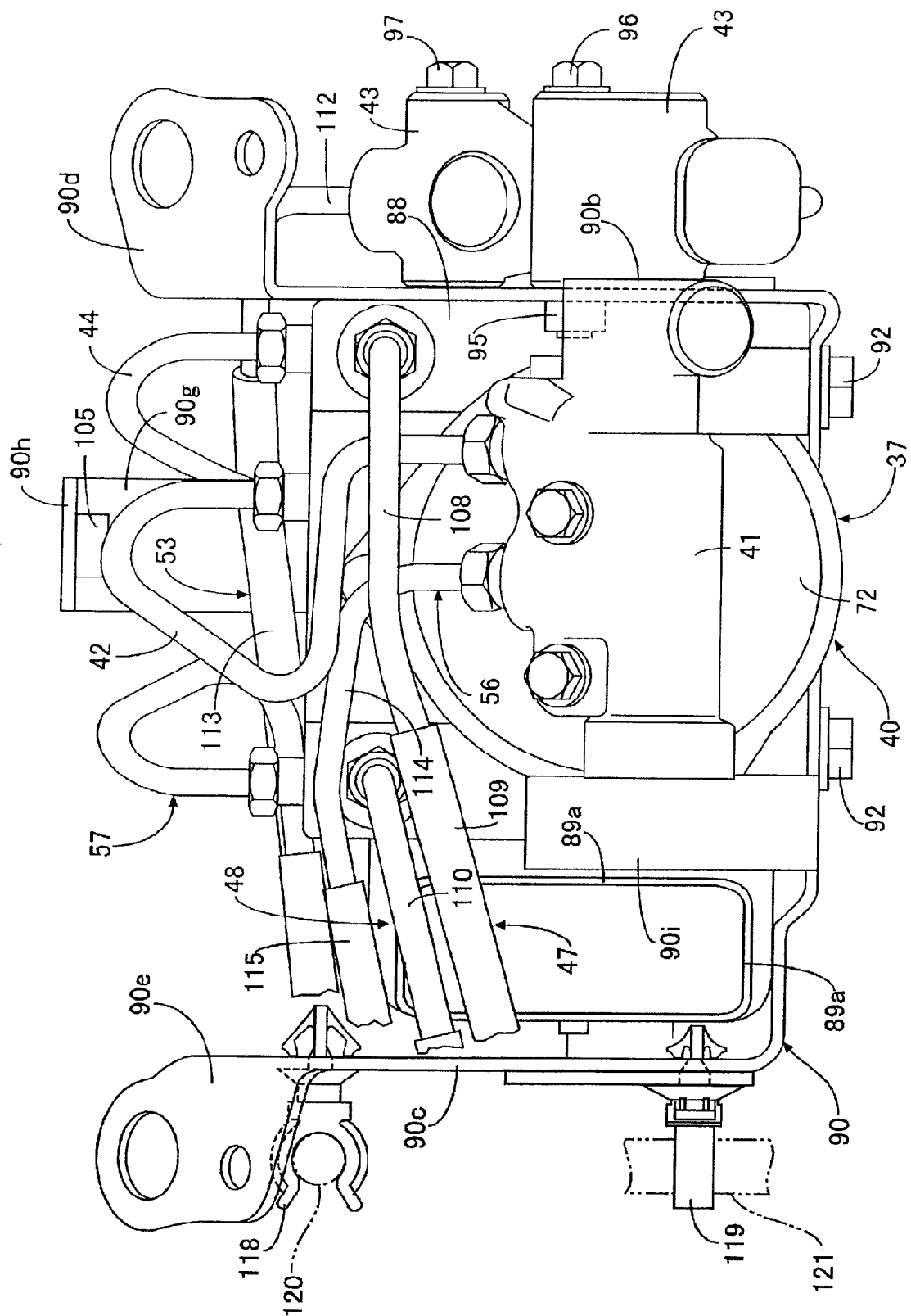
FIG. 9 is a view seen from the arrow 9 in FIG. 7.

On the side opposite to the side where the proportional pressure reducing valve 43 is disposed, between both the left and right sides of the modulator stay 90, i.e., on the right sidewall part 90c, harness holding members 118 and 119 holding middle portions of harnesses 120 and 121 are attached so as to be disposed between both the main frames 13 . . . in the vehicle body frame F in the planar view, as clearly shown in FIG. 9.

Figure 6:
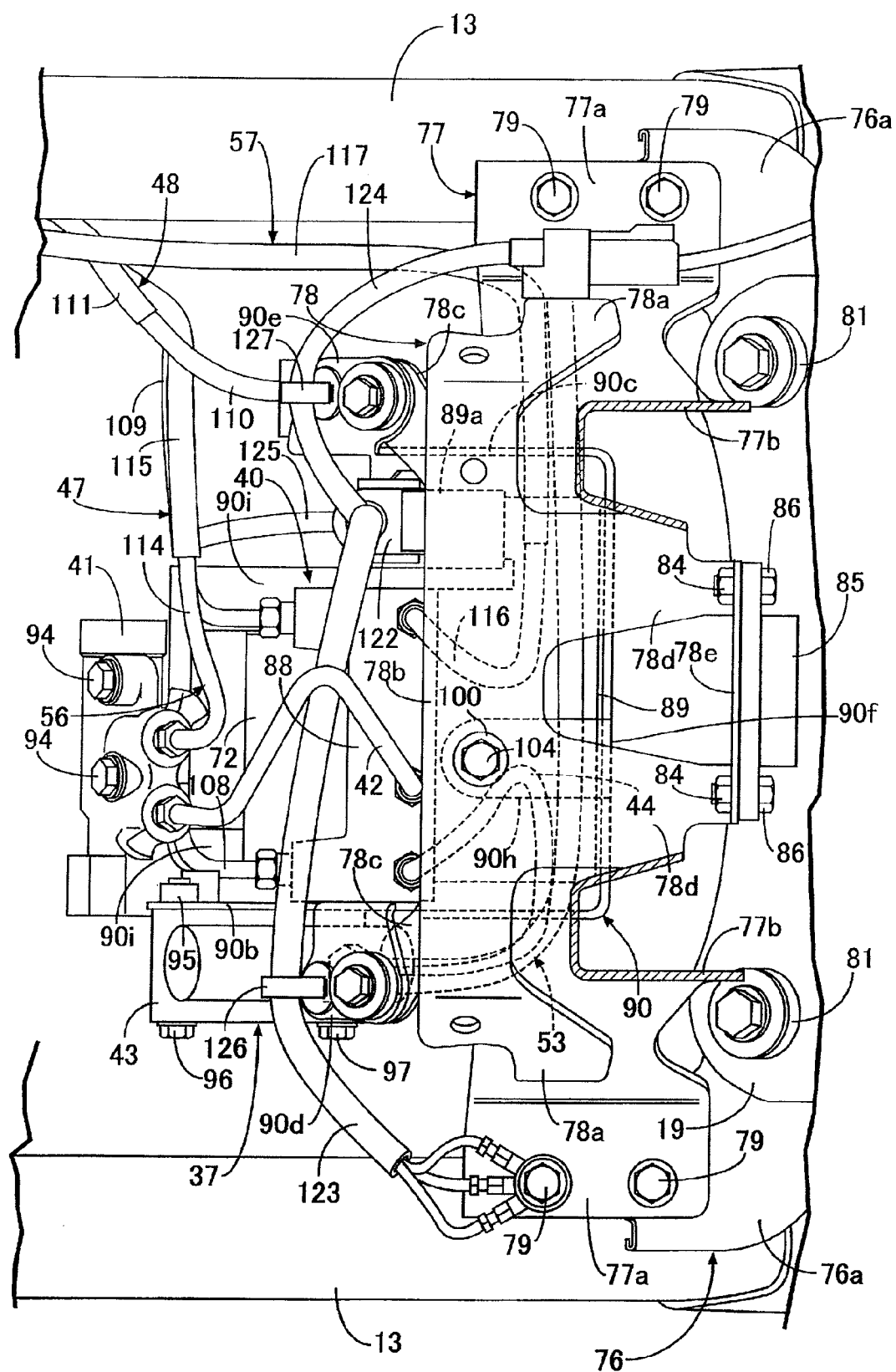
FIG. 6 is an enlarged cross-sectional view taken along the line 6-6 in FIG. 3.
Figure 7:
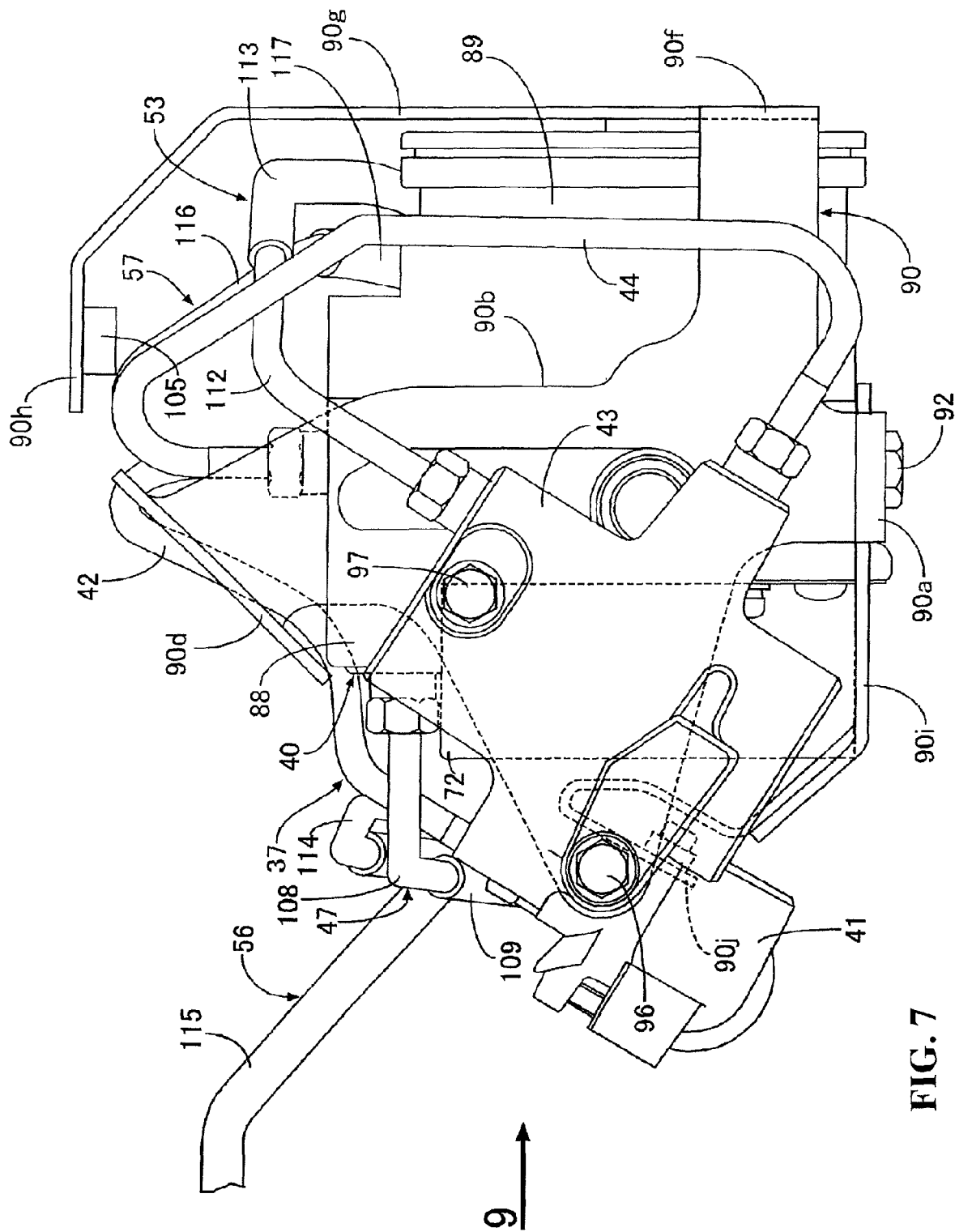
FIG. 7 is a side view of an antilock brake control unit and a modulator stay.
Figure 8:
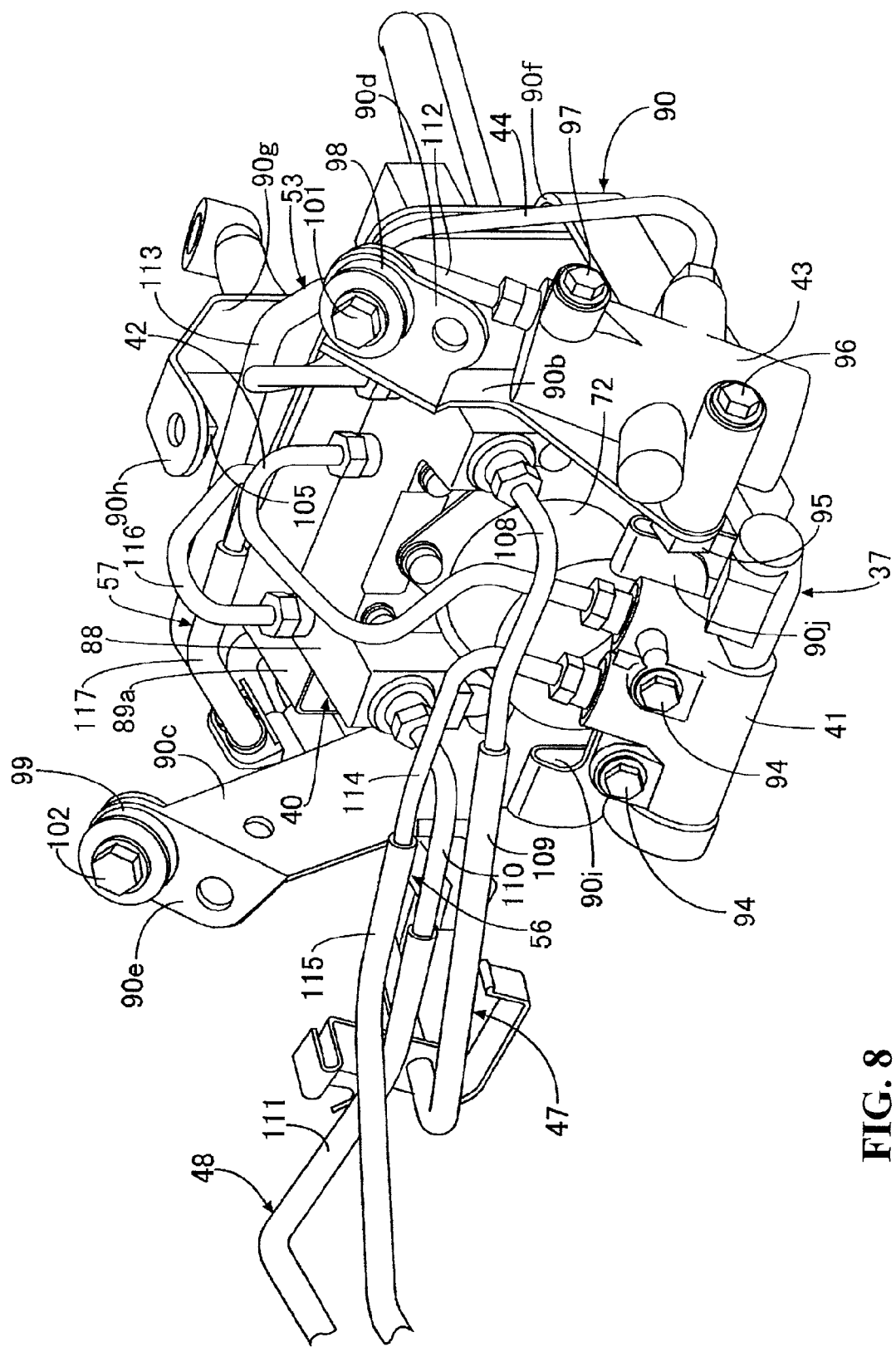
FIG. 8 is a perspective view of the antilock brake control unit and the modulator stay.

The coupler 89a of the hydraulic modulator 40 is disposed between the right sidewall part 90c of the modulator stay 90 and the modulator main body 88. As shown in FIG. 6, an external connector 122 is detachably connected, from the front, to the coupler 89a. A harness 123, electrically connected to the vehicle body frame F, and other harnesses 124 and 125 are commonly connected, for the antilock brake control unit 37, to the external connector 122 with one of a pair of bolts 79, 79 for fastening the left end of the tank supporting frame 76 and the left mounting plate part 77a of the seat supporting frame 77 together with the receiving frame 75. Furthermore, harness holding members 126 and 127 holding middle portions of the harnesses 123 and 124 are attached to the upper left and right supporting plate parts 90d and 90e of the modulator stay 90.

The left and right lower portions of the rear part of the storage box 18 are fixedly supported on both the left and right sides of the connecting plate part 78b in the stay supporting frame 78 as shown in FIG. 3. In the front lower portion of the storage box 18, a projection 18a projecting downwardly in front of the antilock brake control unit 37 is integrally provided. Moreover, a change box 128 is formed in the projection 18a.

Furthermore, an ECU box 130 housing an ECU for controlling the operations of the antilock brake control unit 37 is fixed and disposed between the antilock brake control unit 37 and the fuel tank 19. In this embodiment, the ECU box 130 is integrally provided with a pair of left and right mounting plate parts 130a . . . laterally abutting on the outer surfaces of the middle portions of the pair of left and right supporting leg parts 77b . . . in the seat supporting frame 77. By screwing and fastening bolts 132 . . . inserted into the mounting plate parts 130a . . . and the supporting leg parts 77b . . . to weld nuts 131 . . . fixed on the inner surfaces of the middle portions of both the supporting leg parts 77b . . . , the ECU box 130 is fixed to the middle portions of the pair of left and right supporting leg parts 77b . . . in the seat supporting frame 77.

Next, advantageous effects of this embodiment are described. The seat supporting frame 77 provided between the pair of left and right main frames 13 . . . extending rearwardly and downwardly from the head pipe 12 in the vehicle body frame F crosses the front part of the fuel tank 19 and supports the front part of the riding seat 20 at the upper end thereof. Thus, the load on the front part of the riding seat 20 can be received by the seat supporting frame 77 while avoiding mutual interference between the seat supporting frame 77 and the fuel tank 19. Moreover, since the seat supporting frame 77 extends rearwardly and upwardly from the rear parts of the main frames 13 . . . , the rear lower part of the storage box 18 can be formed to largely extend downwardly while avoiding interference with the seat supporting frame 77. Thus, the capacity of the storage box 18 can be increased as much as possible. Moreover, the antilock brake control unit 37 for preventing the vehicle from falling into the locked state in braking by controlling the fluid pressure supplied to the front wheel disc brake BF and the rear wheel disc brake BR is disposed above the engine unit EU so as to be covered with the seat supporting frame 77 from above. Thus, the storage box 18, the fuel tank 19 and the antilock brake control unit 37 can be compactly disposed.

The antilock brake control unit 37 includes the hydraulic modulator 40 for adjusting the fluid pressure generated by the first and second master cylinders 38 and 39; the delay valve 41 disposed below and in front of the hydraulic modulator 40 so as to further control the fluid pressure from the hydraulic modulator 40; and the first hydraulic pipeline 42 connecting the hydraulic modulator 40 and the first hydraulic control means 41 together. The antilock brake control unit 37 is supported on the vehicle body frame F so as to be disposed in the area A surrounded by the engine unit EU, the storage box 18 and the fuel tank 19 in the side view while allowing the first hydraulic pipeline 42 to slope forward and downwardly in the side view at least in the portion on the delay valve 41 side. As a result, the antilock brake control unit 37 can be compactly disposed while preventing the disposition of the antilock brake control unit 37 from affecting the capacity of the storage box 18.

The antilock brake control unit 37 further includes, in addition to the hydraulic modulator 40, the delay valve 41 and the first hydraulic pipeline 42, the second hydraulic pipeline 44 having the one end connected to the hydraulic modulator 40, and the proportional pressure reducing valve 43 connected to the other end of the second hydraulic pipeline 44 so as to further control the fluid pressure from the hydraulic modulator 40. The proportional pressure reducing valve 43 is disposed on any one of the left and right sides of the hydraulic modulator 40, in this embodiment, on the left side of the hydraulic modulator 40. Moreover, the antilock brake control unit 37 and the modulator stay 90, fixed to the vehicle body frame F so as to support the hydraulic modulator 40, are disposed between the pair of left and right main frames 13 . . . in the vehicle body frame F. Thus, the antilock brake control unit 37 can be compactly disposed in the vehicle width direction. Moreover, since the proportional pressure reducing valve 43 is fastened together with the hydraulic modulator 40 to the modulator stay 90, a special part for supporting the proportional pressure reducing valve 43 on the modulator stay 90 is not required, thereby reducing the number of parts.

On the side opposite to the side where the proportional pressure reducing valve 43 is disposed, between both the left and right sides of the modulator stay 90, i.e., the harness holding members 118 and 119 holding the harnesses 120 and 121 are attached so as to be disposed between both the main frames 13 . . . in the planar view. Thus, not only the antilock brake control unit 37 but also the harnesses 120 and 121 can be compactly disposed between the left and right main frames 13 . . . .

The projection 18a projecting downwardly in front of the antilock brake control unit 37 is integrally provided in the front lower portion of the storage box 18 with the change box 128 being formed in the projection 18a. Thus, the change box 128 can be formed in the storage box 18 while avoiding interference with the delay valve 41 in the antilock brake control unit 37.

Furthermore, the ECU box 130 housing the ECU for controlling operations of the antilock brake control unit 37 is fixed and disposed between the antilock brake control unit 37 and the fuel tank 19. Thus, not only the antilock brake control unit 37 but also the ECU box 130 can be compactly disposed.

Furthermore, the hydraulic modulator 40 includes the modulator main body 88 and the cover 89 integrally provided with the coupler 89a and attached to the modulator main body 88. In the modulator stay 90, the pair of left and right sidewall parts 90b and 90c are provided so as to sandwich the modulator main body 88 therebetween. The coupler 89a is disposed between the modulator main body 88 and the right sidewall part 90c of the pair of left and right sidewall parts 90b and 90c. Thus, the harnesses 123, 124 and 125 for the antilock brake control unit 37, which are relatively large in size, and the antilock brake control unit 37 can be compactly disposed in the vehicle width direction.

While the embodiment of the present invention has been described above, the present invention is not limited to the above embodiment, but various design changes can be made without departing from the present invention described in the scope of claims.

For example, although the first and second master cylinders 38 and 39 are used as the hydraulic generating means in the above embodiment, a hydraulic pump driven by an electric motor may be used to generate the fluid pressure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-riding vehicle comprising:
    a vehicle body frame having a head pipe steerably supporting a front fork pivotally supporting a front wheel and a pair of left and right main frames extending rearwardly from the head pipe;
    an engine unit supported on the vehicle body frame;
    a storage box supported on the main frames and disposed behind the head pipe and above the engine unit;
    a fuel tank supported on the vehicle body frame and disposed behind the storage box and obliquely above and behind the engine unit;
    a riding seat disposed above the fuel tank;
    an antilock brake control unit for preventing the vehicle from falling into a locked state in braking by controlling the pressure of fluid supplied to a disc brake provided on at least one of the front wheel and a rear wheel;
    a seat supporting frame extending rearwardly and upwardly from the rear part of the pair of left and right main frames and crossing a front part of the fuel tank is provided between the pair of left and right main frames with an upper end of the seat supporting frame supporting a front part of the riding seat, said antilock brake control unit being disposed above the engine unit so as to be covered with the seat supporting frame from above; and
    a hydraulic modulator for adjusting a fluid pressure generated by hydraulic generating means, first hydraulic control means disposed below and in front of the hydraulic modulator for further control of the fluid pressure from the hydraulic modulator, and a first hydraulic pipeline connecting the hydraulic modulator and the first hydraulic control means together and sloping forward and downwardly in the side view at least in a portion on a first hydraulic control means side is disposed in an area surrounded by the engine unit, the storage box and the fuel tank in the side view and is thus supported on the vehicle body frame.

2. The saddle-riding vehicle according to claim 1, wherein the antilock brake control unit further includes, in addition to the hydraulic modulator, the first hydraulic pipeline and the first hydraulic control means, a second hydraulic pipeline having one end connected to the hydraulic modulator, and second hydraulic control means connected to another end of the second hydraulic pipeline for further control of the fluid pressure from the hydraulic modulator and disposed on any one of the left and right sides of the hydraulic modulator;
    the antilock brake control unit and a modulator stay fixed to the vehicle body frame so as to support the hydraulic modulator are disposed between the pair of left and right main frames; and
    the second hydraulic control means is fastened together with the hydraulic modulator to the modulator stay.

3. The saddle-riding vehicle according to claim 2, wherein harness holding members holding harnesses are attached to the side opposite to one of the left and right sides of the modulator stay where the second hydraulic control means is disposed, the harness holding members disposed between both the main frames in the planar view.

4. The saddle-riding vehicle according to claim 3, wherein a projection projecting downwardly in front of the antilock brake control unit is integrally provided in a front lower portion of the storage box, and
    a change box is formed in the projection.

5. The saddle-riding vehicle according to claim 3, wherein the hydraulic modulator includes a modulator main body and a cover integrally provided with a coupler and attached to the modulator main body;
    a pair of left and right sidewall parts are provided in the modulator stay to sandwich the modulator main body therebetween; and
    the coupler is disposed between the modulator main body and one of the pair of left and right sidewall parts.

6. The saddle-riding vehicle according to claim 2, wherein a projection projecting downwardly in front of the antilock brake control unit is integrally provided in a front lower portion of the storage box, and
    a change box is formed in the projection.

7. The saddle-riding vehicle according to claim 1, wherein a projection projecting downwardly in front of the antilock brake control unit is integrally provided in a front lower portion of the storage box, and
    a change box is formed in the projection.

8. The antilock brake control for use with a saddle-riding vehicle according to claim 1, and further including an ECU box housing an ECU for controlling operations of the antilock brake control unit, said ECU box being fixed and disposed between the antilock brake control unit and the fuel tank.

9. An antilock brake control for use with a saddle-riding vehicle comprising:
    an antilock brake control unit for preventing the vehicle from falling into a locked state in braking by controlling the pressure of fluid supplied to a disc brake provided on at least one of a front wheel and a rear wheel,
    a seat supporting frame extending rearwardly and upwardly from a rear part of a pair of left and right main frames and crossing a front part of a fuel tank;
    the antilock brake control unit is disposed above an engine unit to be covered with the seat supporting frame from above;
    a projection projecting downwardly in front of the antilock brake control unit is integrally provided in a front lower portion of a storage box, and
    a change box is formed in the projection.

10. The antilock brake control for use with a saddle-riding vehicle according to claim 9, wherein the antilock brake control unit includes a hydraulic modulator for adjusting a fluid pressure generated by hydraulic generating means, first hydraulic control means disposed below and in front of the hydraulic modulator for further control of the fluid pressure from the hydraulic modulator, and a first hydraulic pipeline connecting the hydraulic modulator and the first hydraulic control means together and sloping forward and downwardly in the side view at least in a portion on a first hydraulic control means side is disposed in an area surrounded by the engine unit, a storage box and the fuel tank in the side view and is thus supported on a vehicle body frame.

11. The antilock brake control for use with a saddle-riding vehicle according to claim 10, wherein the antilock brake control unit further includes, in addition to the hydraulic modulator, the first hydraulic pipeline and the first hydraulic control means, a second hydraulic pipeline having one end connected to the hydraulic modulator, and second hydraulic control means connected to another end of the second hydraulic pipeline for further control of the fluid pressure from the hydraulic modulator and disposed on any one of the left and right sides of the hydraulic modulator;
    the antilock brake control unit and a modulator stay fixed to a vehicle body frame so as to support the hydraulic modulator are disposed between the pair of left and right main frames; and the second hydraulic control means is fastened together with the hydraulic modulator to the modulator stay.

12. The antilock brake control for use with a saddle-riding vehicle according to claim 11, wherein harness holding members holding harnesses are attached to the side opposite to one of the left and right sides of the modulator stay where the second hydraulic control means is disposed, the harness holding members disposed between both the main frames in the planar view.

* * * * *